(12) United States Patent
Schacht et al.

(10) Patent No.: US 10,052,987 B2
(45) Date of Patent: Aug. 21, 2018

(54) VEHICLE SEAT

(71) Applicant: TS TECH CO., LTD., Asaka-shi, Saitama (JP)

(72) Inventors: Samual T. Schacht, Reynoldsburg, OH (US); Elizabeth L. Chambers, Reynoldsburg, OH (US); Katsuhiro Kiya, Reynoldsburg, OH (US); Jeffrey J. Finni, Reynoldsburg, OH (US); Nicholas Domicone, Reynoldsburg, OH (US); Ashley E. Keach, Reynoldsburg, OH (US); Hideo Mitsui, Reynoldsburg, OH (US); Nathan A. Hartley, Reynoldsburg, OH (US)

(73) Assignee: TS TECH CO., LTD., Saitama (JP)

( * ) Notice: Subject to any disclaimer, the term of this patent is extended or adjusted under 35 U.S.C. 154(b) by 98 days.

(21) Appl. No.: 15/247,501

(22) Filed: Aug. 25, 2016

(65) Prior Publication Data

US 2018/0056836 A1 Mar. 1, 2018

(51) Int. Cl.
*B60N 2/58* (2006.01)
*B60N 2/72* (2006.01)
*B60N 2/44* (2006.01)
*B60N 2/90* (2018.01)

(52) U.S. Cl.
CPC ......... *B60N 2/5858* (2013.01); *B60N 2/4415* (2013.01); *B60N 2/5825* (2013.01); *B60N 2/72* (2013.01); *B60N 2/914* (2018.02); *B60N 2/99* (2018.02)

(58) Field of Classification Search
CPC .... B60N 2/4415; B60N 2/449; B60N 2/4492; B60N 2/5825; B60N 2/5858; B60N 2/5883; B60N 2/72; B60N 2/914; B60N 2/986; B60N 2/99
See application file for complete search history.

(56) References Cited

U.S. PATENT DOCUMENTS 6,357,789 B1 *  3/2002  Harada .................. B60R 21/207
                                                      280/728.3
6,439,597 B1 *  8/2002  Harada .................. B60R 21/207
                                                      280/728.2

(Continued)

FOREIGN PATENT DOCUMENTS

DE    102005012320 A1 *  9/2006  ........... B60N 2/5825
DE    102009051120 A1 *  5/2011  ........... B60N 2/5825

(Continued)

*Primary Examiner* — Ryan D Kwiecinski
(74) *Attorney, Agent, or Firm* — Hamre, Schumann, Mueller & Larson, P.C.

(57) ABSTRACT

In a vehicle seat, a base frame is provided at a back side of a cushion pad to support the cushion pad, and an outer covering is configured to cover a front side of the cushion pad and fixed to the base frame. The outer covering includes a first portion. A receptacle hole is provided at the front side of a cushion pad. An actuator is configured to move the first portion to a first position in which part of the first portion is located inside the receptacle hole, and to a second position farther away from the base frame than the first position. An elastic member is provided in the receptacle hole, connected to the part of the first portion, and configured to bias the first portion toward the base frame.

9 Claims, 8 Drawing Sheets

(56) References Cited

U.S. PATENT DOCUMENTS

| | | | |
|---|---|---|---|
| 6,578,911 B2 * | 6/2003 | Harada | B60N 2/5825 280/730.2 |
| 2005/0150090 A1 * | 7/2005 | Pedde | B60N 2/5825 24/698.1 |
| 2006/0214485 A1 * | 9/2006 | Brockschnieder | B60N 2/5816 297/228.11 |
| 2008/0136237 A1 * | 6/2008 | Kayumi | B60N 2/99 297/284.9 |
| 2011/0080033 A1 * | 4/2011 | Hofmann | B60N 2/5825 297/463.1 |
| 2015/0108806 A1 * | 4/2015 | Nagayasu | B60N 2/7094 297/337 |
| 2017/0036634 A1 * | 2/2017 | Ohno | B60N 2/90 |

FOREIGN PATENT DOCUMENTS

| | | | | |
|---|---|---|---|---|
| EP | 3020600 A1 * | 5/2016 | | B60N 2/72 |
| EP | 3034353 A1 * | 6/2016 | | B60N 2/70 |
| JP | S61109836 | 7/1986 | | |
| JP | 2001061598 A * | 3/2001 | | B60N 2/5685 |
| JP | 2016094072 A * | 5/2016 | | B60N 2/72 |
| WO | WO-2006036006 A1 * | 4/2006 | | B60N 2/5825 |
| WO | WO-2006132400 A1 * | 12/2006 | | B60N 2/20 |
| WO | WO-2010131322 A1 * | 11/2010 | | B60N 2/449 |
| WO | WO-2014126116 A1 * | 8/2014 | | B60R 21/207 |
| WO | WO-2015092505 A1 * | 6/2015 | | B60N 2/99 |

\* cited by examiner

VEHICLE SEAT

BACKGROUND

1. Field

Apparatuses disclosed herein relate to a vehicle seat comprising an actuator configured to move a part of an outer covering.

2. Description of the Related Art

A vehicle seat may comprise, as known in the art (e.g., see JP S61-109836 U), a seat back such that frontward-bulging side support portions provided at left and right sides of the seat back are each configured to include a bladder. This seat back may typically comprise a seat back pad, an outer covering, and bladders. The seat back pad includes left and right side portions and a center portion, and is configured such that the side portions bulge frontward farther than the center portion. The outer covering is configured to cover the seat back pad from the front side. The bladder is provided between the outer covering and each of the side portions of the seat back pad.

A tuck-in groove for tucking a part of the outer covering therein is formed between each side portion and the center portion of the seat back pad. Through regulation of the amount of air supplied into the bladder, the side support portions can be deformed to conform to the physique of an occupant so that the seat back is contoured to fit the occupant's body.

SUMMARY

In the vehicle seat configured as described above, inflation of the bladder would possibly cause the part of the outer covering tucked in the tuck-in groove to come out of the tuck-in groove. In this event, subsequent deflation of bladder could fail to restore the part of the outer covering to the inside of the tuck-in groove and let it remain slack outside the tuck-in groove. That slacking part of the outer covering would disadvantageously disfigure the seat back, and/or come in contact with the back of the occupant, causing the occupant discomfort.

There is a need to provide a vehicle seat comprising an actuator configured to move a part of an outer covering with a feature by which the possibility of failure of restoration of a part of an outer covering back into an opening formed in a cushion pad can be minimized.

The present invention has been made in an attempt to realize such a vehicle seat.

Specifically, a vehicle seat according to one or more embodiments disclosed herein comprises a cushion pad, a base frame, an outer covering, an actuator, and an elastic member. The cushion pad has a front side and a back side, and a receptacle hole provided at the front side. The base frame is provided at the back side to support the cushion pad. The outer covering is configured to cover the front side of the cushion pad and fixed to the base frame. The outer covering includes a first portion. The actuator is configured to move the first portion to a first position in which a part of the first portion is located inside the receptacle hole, and to a second position farther away from the base frame than the first position. The elastic member is provided in the receptacle hole, connected to the part of the first portion, and configured to bias the first portion toward the base frame.

BRIEF DESCRIPTION OF THE DRAWINGS

The above and other aspects, other advantages and further features of the present invention will become more apparent by describing in detail illustrative, non-limiting embodiments thereof with reference to the accompanying drawings, in which.

DESCRIPTION OF THE EMBODIMENTS

A description will now be given of one illustrative, non-limiting embodiment with reference to the drawings. In the following description, the terms frontward/rearward and left/right (lateral) are used to designate the relevant directions with respect to the viewpoint of an occupant seated on the seat. Further, "front side" refers to a side of the seat on which the occupant is to be seated, while "back side" refers to the reverse side thereof. In particular, the terms "laterally inner (or laterally inward)" and "laterally outer (or laterally outward)" are used to refer to the relative positions with respect to the center of the seat in the lateral direction (i.e. closer to the center of the seat in the lateral direction or away from the center of the seat in the lateral direction) unless indicated otherwise. When these terms are used to designate the relative positions with respect to the center of the vehicle in the lateral direction (i.e., closer to or away from the center of the seat in the lateral direction), they are explicitly referred to as laterally inner or outer side (laterally inward or outward) with respect to the vehicle (i.e., closer to or away from the center of the vehicle).

Figure 1:
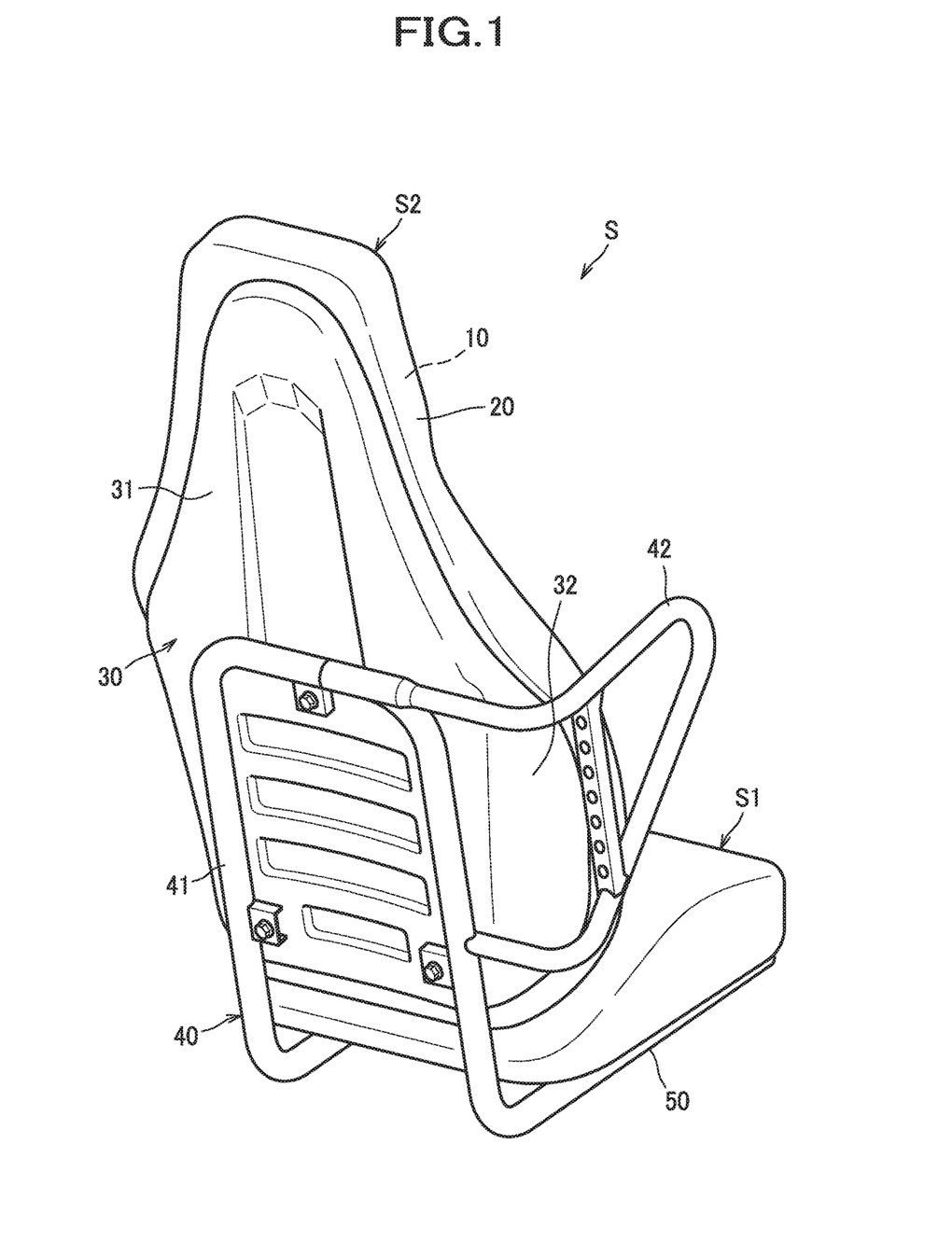
FIG. 1 is a perspective view of a vehicle seat according to one illustrative embodiment as viewed from a back side thereof.

A car seat S as an example of a vehicle seat is illustrated in FIG. 1. The car seat S is a seat to be used for a driver's seat and mainly includes a seat cushion S1 and a seat back S2. The seat back S2 includes a seat back pad 10 as an example of a cushion pad, an outer covering 20 configured to cover the seat back pad 10, a back plate 30 as an example of a base frame, and a support frame 40.

The support frame 40 is a frame made of cylindrical metal pipes combined together by welding. The support frame 40 includes a support portion 41 provided at a back side of the back plate 30 to support the back plate 30, and a protruding portion 42 configured to extend from the support portion 41 along a laterally outer side of the back plate 30 (on a right side of the seat back pad 10), and to protrude frontward beyond the seat back pad 10.

The support portion 41 is a portion of the support frame 40 and made of a cylindrical pipe bent in the shape of a letter U. The support portion 41 extends along the left-side region (that is the laterally inner side with respect to the center of the vehicle) of the back-side surface of the back plate 30 from a lower end upward and is bent to extend horizontally to the right (laterally outward with respect to the center of the vehicle) and is further bent to extend downward along the right-side region (that is the laterally outer side with respect to the vehicle) of the back-side surface of the back plate 30, and terminates at another lower end.

The lower ends of the support portion 41 are connected integrally to an underside support frame 50 configured to support the seat cushion S1. The support portion 41 extends from the underside support frame 50 upward, and an uppermost horizontal portion thereof is located at a center of the back plate 30 in the vertical direction.

The protruding portion 42 is a portion configured to reduce the potential risk of the occupant falling off the car seat S to the outside of the vehicle, and made of a cylindrical pipe bent approximately in the shape of a letter V. The protruding portion 42 extends from the uppermost horizontal portion of the support portion 41 to the right and is bent to extend frontward. The protruding portion 42 includes a curved portion provided at a forward end thereof. This curved portion is a portion curved downward and located beyond the seat back pad 10 frontward. The protruding portion 42 extends from a lower end of the curved portion in an oblique rearward-and-downward direction, and is bent to extend to the left, and connected to a right-side portion of the support portion 41.

Figure 2:
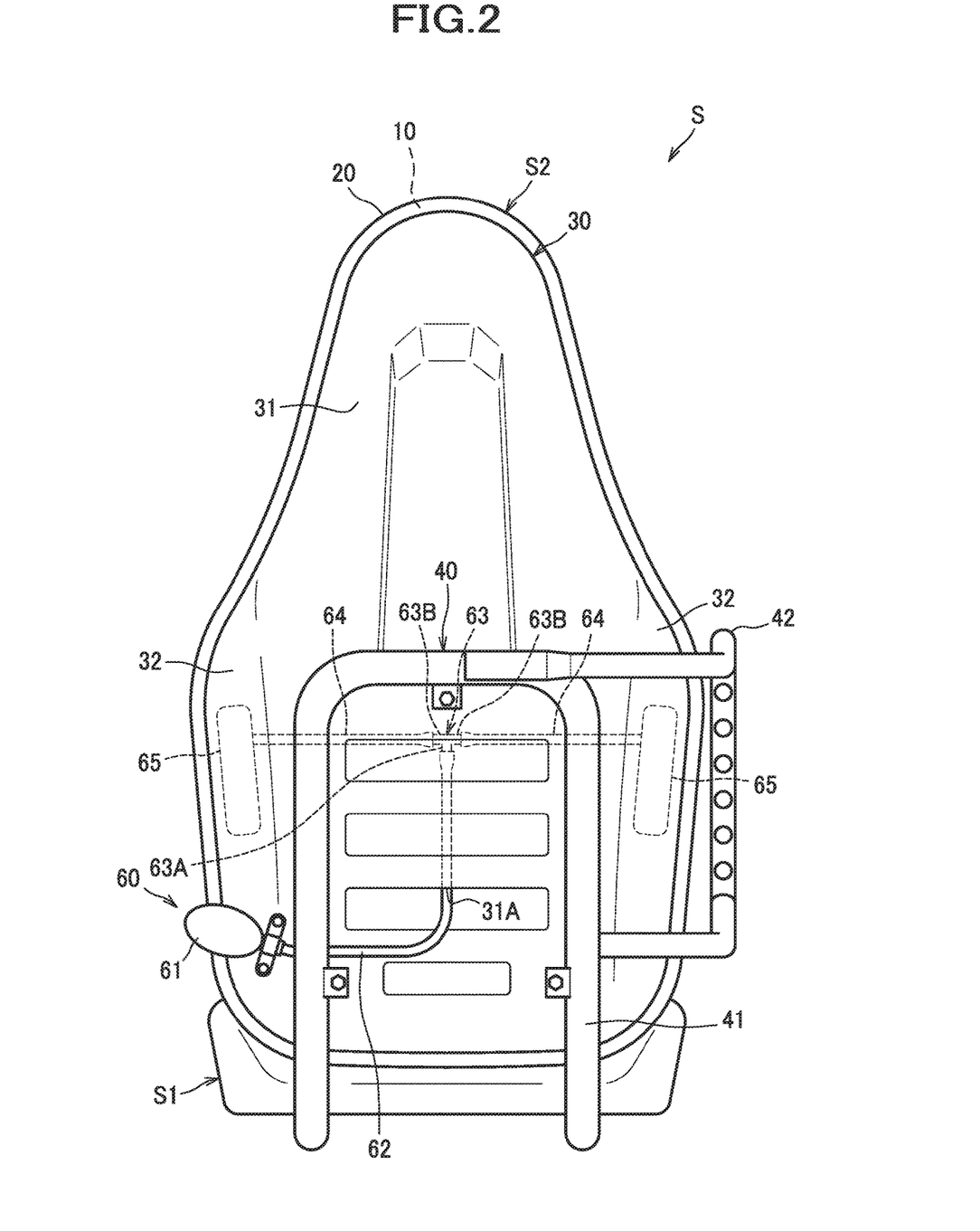
FIG. 2 is a back elevation of a side support actuator.

The back plate 30 is a member made of a plastic plate and provided at a back side of the seat back pad 10 to support the back side of the seat back pad 10. The back plate 30 includes a base portion 31 configured to support the back of an occupant, and left and right sidewall portions 32 extend respectively from left and right sides of the lower portion of the base portion 31 frontward. As shown in FIG. 2, a hand-operated pump 61 as an example of a pump is provided at a lower portion of the left sidewall portion 32 (at the laterally inner side with respect to the vehicle, i.e., closer to the center of the vehicle in the lateral direction). The hand-operated pump 61 is a member that constitutes a side support actuator 60 as an example of an actuator. The hand-operated pump 61 is disposed on a side opposite to a side on which the protruding portion 42 is disposed, with respect to the center of the seat back pad 10 in the lateral direction. In other words, the protruding portion 42 is disposed on a first side that is one of two sides defined by a vertical plane intersecting a center in the lateral direction of the seat back pad 10, while the hand-operated pump is disposed on a second side that is another of the two sides defined by the vertical plane.

Figure 6:
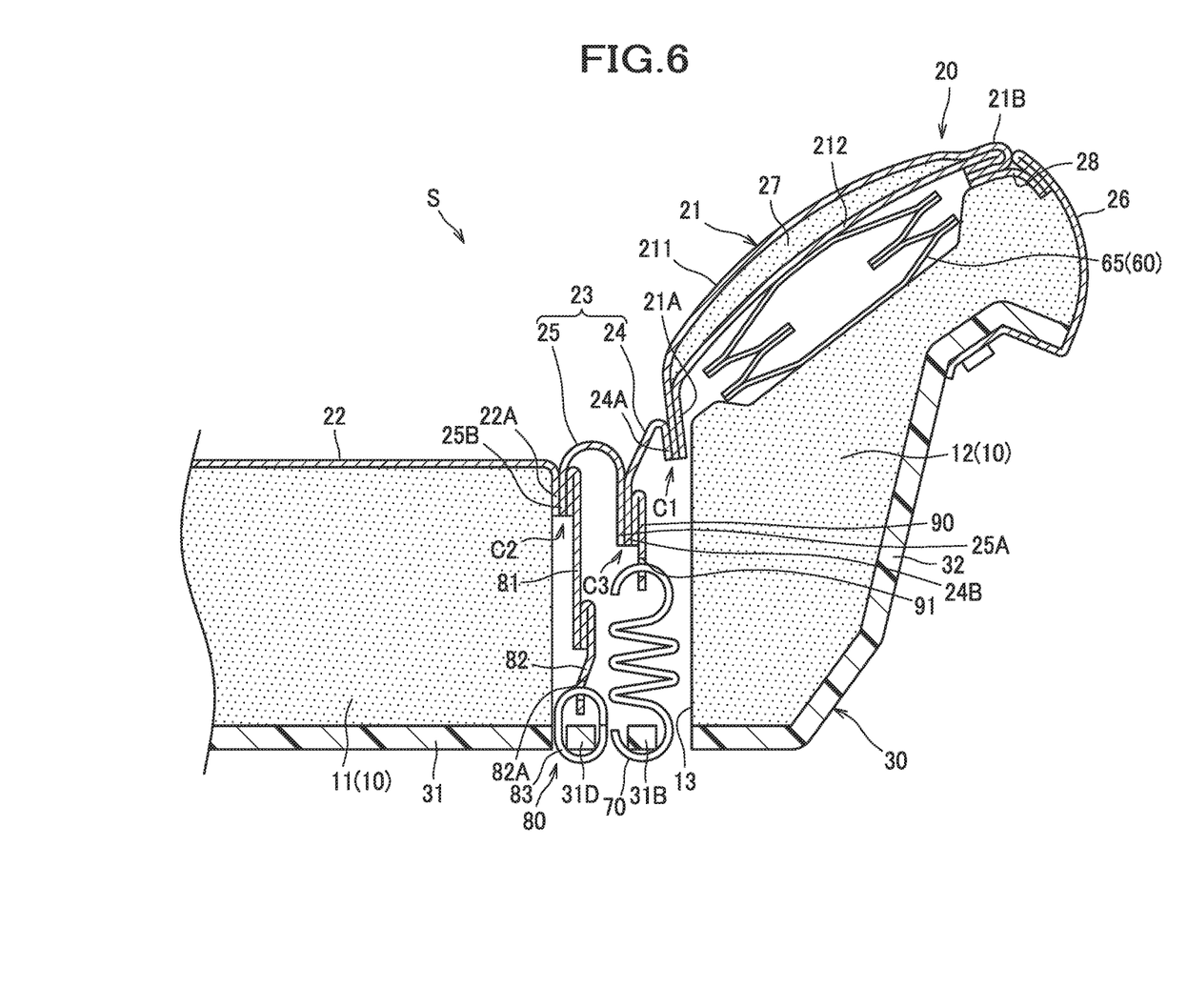
FIG. 6 is a sectional view showing an arrangement of an extension coil spring and a structure around the extension coil spring as viewed in a state where a first covering member is in a first position.
Figure 7:
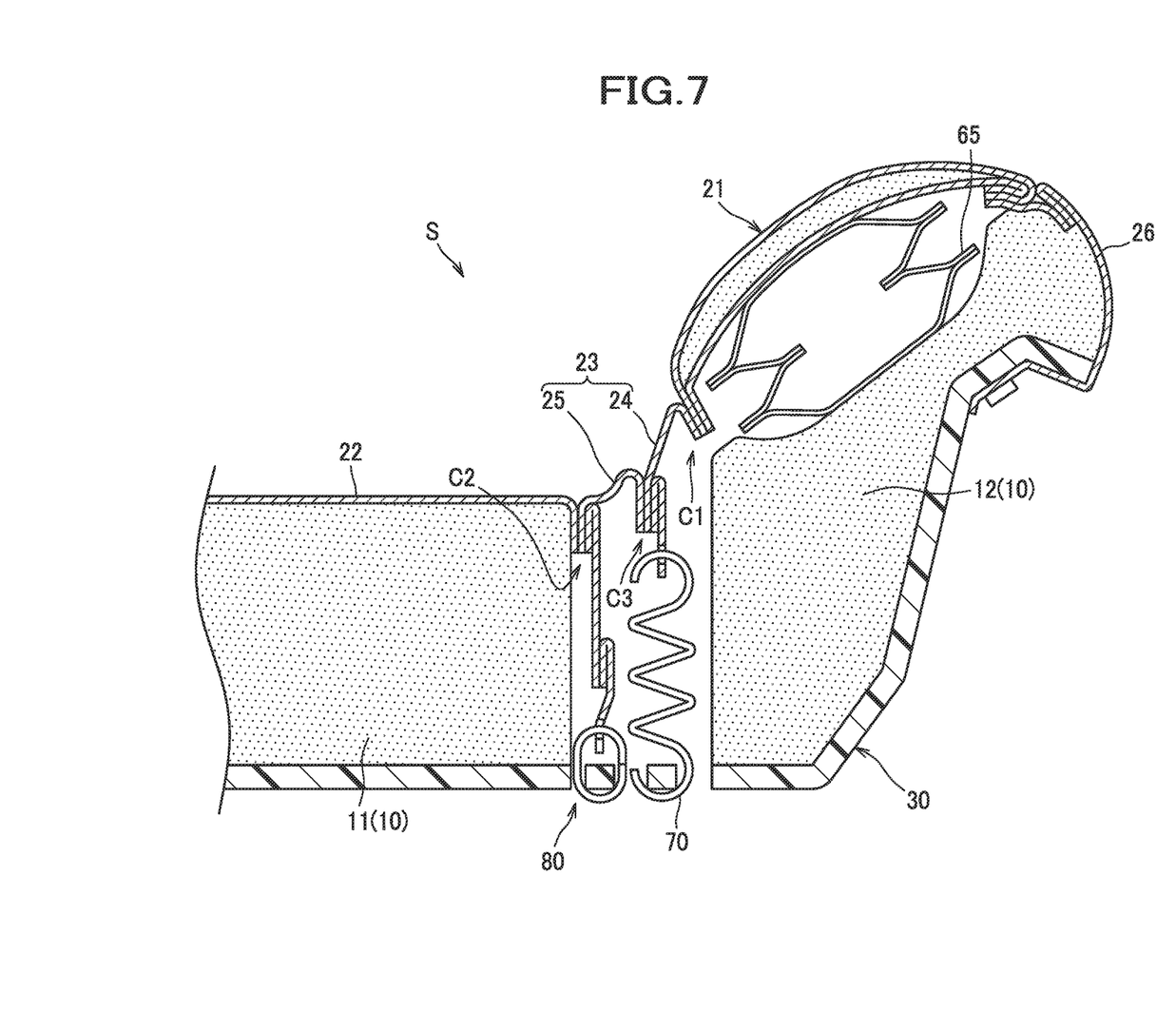
FIG. 7 is a sectional view showing an arrangement of the extension coil spring and the structure around the extension coil spring as viewed in a state where the first covering member is in a second position.

The side support actuator 60 is a device configured to move a part (first covering member 21 which will be described later) of the outer covering 20 to a first position as shown in FIG. 6 and to a second position as shown in FIG. 7. The second position is a position farther away from the back plate 30 than the first position. The side support actuator 60 includes the aforementioned hand-operated pump 61, a first tube 62 connected to the hand-operated pump 61, a pipe tee fitting 63 connected to the first tube 62, two second tubes 64 connected to the fitting 63, and two bladders 65 connected respectively to the second tubes 64.

The first tube 62 is connected to the hand-operated pump 61 which includes a valve (not shown). The valve regulates a flow of air supplied through the hand-operated pump 61 to each of the bladders 65 in such a way that the flow of air introduced from outside through the hand-operated pump 61 is permitted to be supplied to each of the bladders 65 and the reverse flow of air is blocked. This valve is configured to be opened by pressing a button (not shown) provided at the hand-operated pump 61 so as to allow air to flow from each of the bladders 65 through the hand-operated pump 61 to the outside.

The first tube 62 is inserted through a hole 31A formed at a lower region of the base portion 31 of the back plate 30 and put between the back plate 30 and the seat back pad 10. The first tube 62 thus inserted through the hole 31A extends upward and is connected to the fitting 63.

The fitting 63 includes a first cylindrical portion 63A to which the first tube 62 is connected, and two second cylindrical portions 63B to which the second tubes 64 are connected respectively. The first cylindrical portion 63A extends in an upward-downward direction. The second cylindrical portions 63B extend from an upper end of the first cylindrical portion 63A in laterally outward directions opposite to each other (i.e., leftward and rightward). The fitting 63 is disposed in a space a lower end of which is higher than an upper end of the hand-operated pump 61 and an upper end of which is lower than a lower end of the uppermost horizontal portion of the support portion 41 of the support frame 40.

Each bladder 65 is disposed at the same height as that at which the fitting 63 is disposed. To be more specific, each bladder 65 includes a portion of which upper and lower ends respectively have the same heights as those of a space occupied by the fitting 63.

Figure 3:
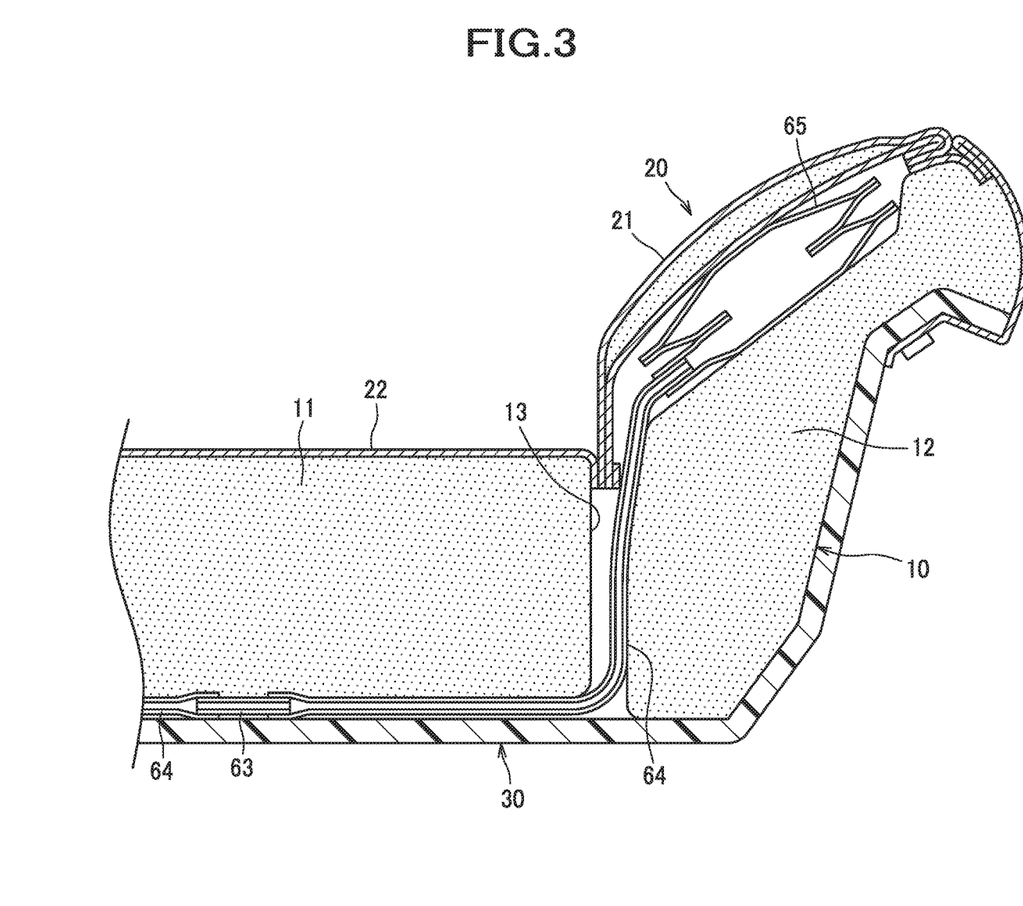
FIG. 3 is a sectional view showing an arrangement of a second tube and a structure around the second tube.

As shown in FIG. 3, each bladder 65 is disposed between a corresponding (left or right) side portion (side support portion 12 which will be described later) of the seat back pad 10 and a corresponding (left or right) side portion (first covering member 21 which will be described later) of the outer covering 20. The bladder 65 has left and right expandably contractible accordion-pleated side portions, and thus is deformable to a contracted state as shown in FIG. 3 and to an expanded state as shown in FIG. 7. To be more specific, the bladder 65 in the state shown in FIG. 3 may be caused, when supplied with air, to inflate in a frontward-and-laterally-inward direction (in a direction generally frontward but biased toward the center in the lateral direction of the car seat S), and may be caused, when the valve of the hand-operated pump 61 is opened, to deflate by the occupant's body pressed thereagainst.

The second tubes 64 extend from the fitting 63 in laterally outward directions, leftward and rightward, respectively, passing through the receptacle holes 13, and are connected to the respective bladders 65. In other words, the second tubes 64 serve to connect the bladders 65 to the hand-operated pump 61 through the fitting 63 and the first tube 62.

Figure 4:
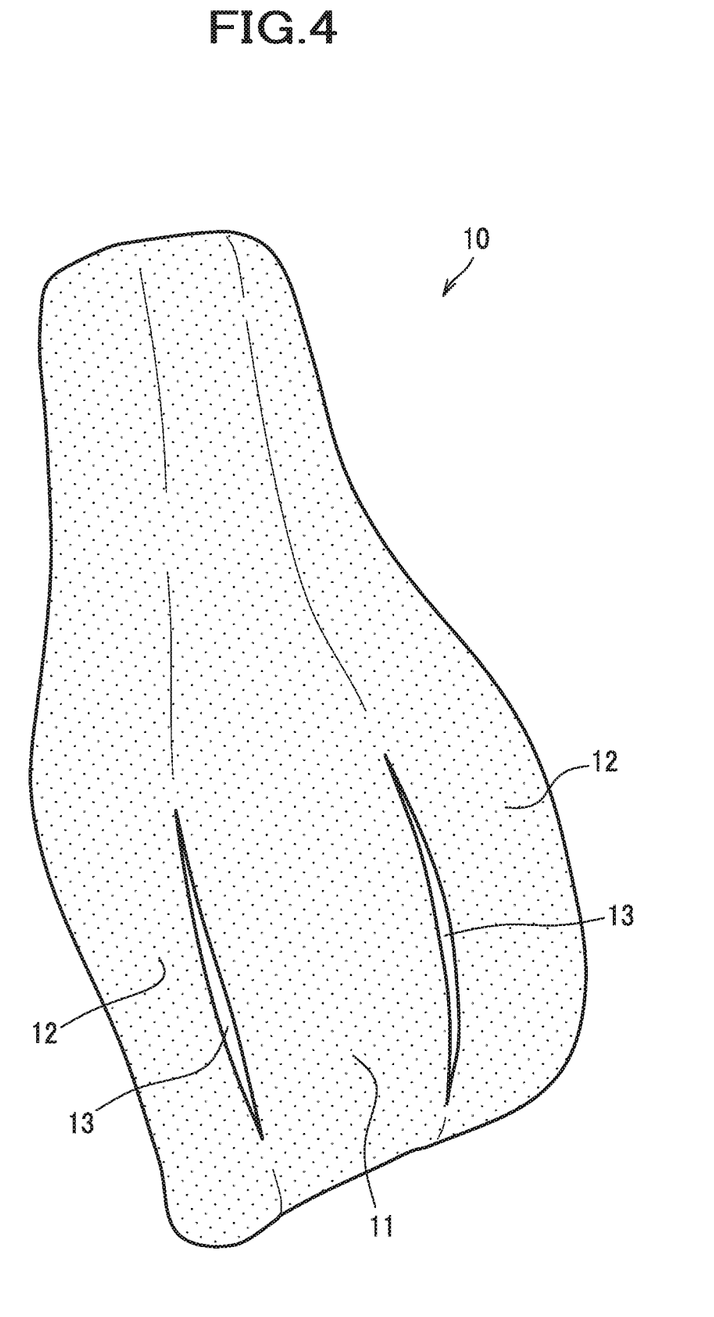
FIG. 4 is a perspective view of a seat back pad as viewed from a front side thereof.

As shown in FIG. 4, the seat back pad 10 is made of a cushiony material such as urethane foam, and principally includes a base pad portion 11 and two side support portions 12. The base pad portion 11 constitutes a laterally central portion of the seat back pad 10. The side support portions constitute laterally (left and right) side portions of the seat back pad 10. Each side support portion 12 is configured to support the upper body of an occupant from a laterally outer side (left or right side) thereof. The side support portion 12 is formed to bulge frontward farther than the base pad portion 11. To be more specific, the side support portion 12 protrudes from the left or right end of the base pad portion 11 in an oblique-frontward-and-laterally-outward direction.

Two receptacle holes 13 are provided between the base pad portion 11 and the corresponding side support portions 12. That is, each receptacle hole 13 is provided adjacent to the corresponding (left or right) side support portion 12. The receptacle hole 13 is a through hole provided to pierce the front side and the back side of the seat back pad 10, so that the back side of the outer covering 20 and the front side of the back plate 30 both face on the receptacle hole 13 and are opposed to each other on opposite sides of the communicating receptacle hole 13 (see FIG. 3). The receptacle hole 13 is an elongated slot extending from a position short of the lower end of the seat back pad 10 to a substantially central position in the upward-downward direction of the seat back pad 10 (see FIG. 4).

Figure 5:
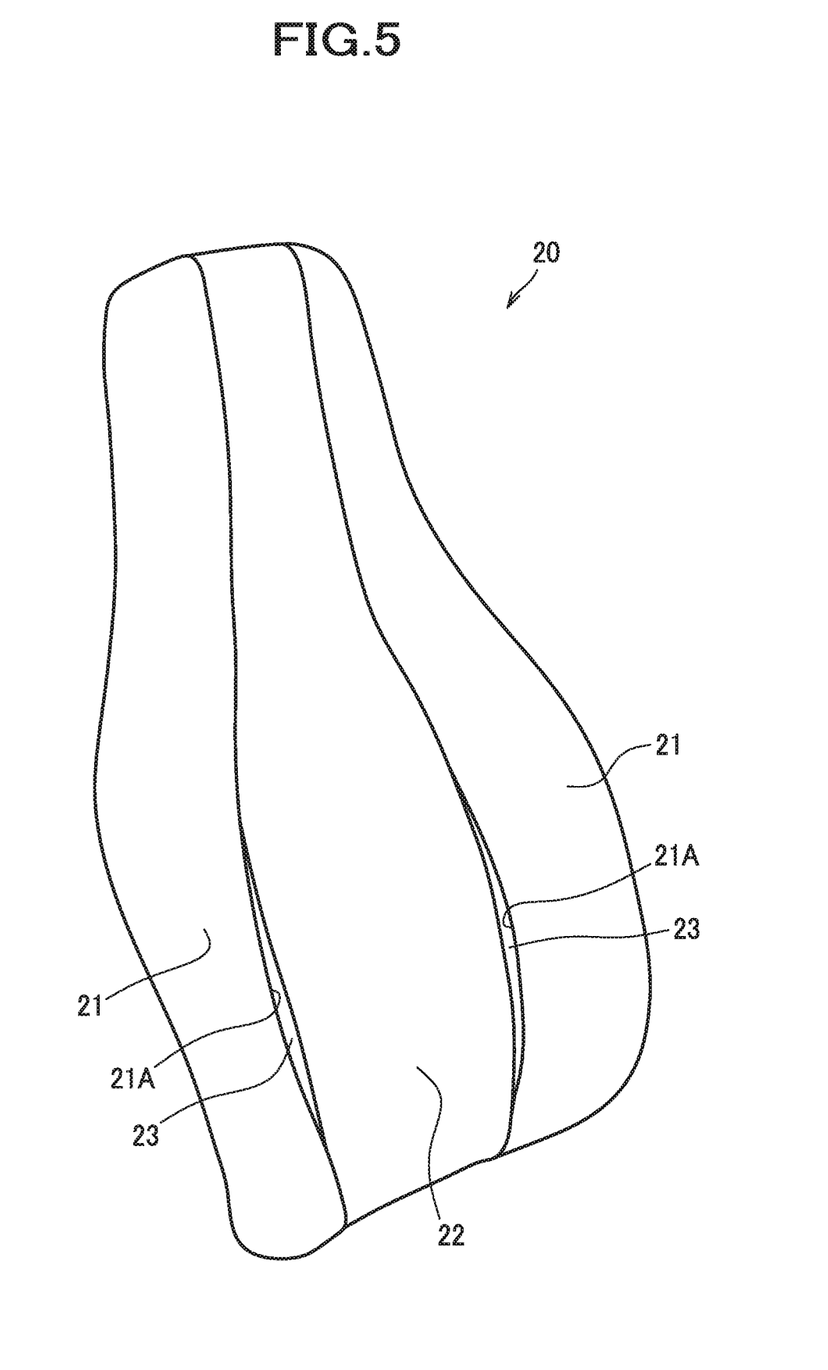
FIG. 5 is a perspective view of an outer covering attached to the seat back pad as viewed from a front side thereof.

As shown in FIG. 5, the outer covering 20 mainly includes two first covering members 21, one second covering member 22, and two third covering members 23. Each first covering member 21 is an example of a first portion, and the second covering member 22 is an example of a second portion. The third covering members 23 are disposed to span a nearly half of the longitudinal dimension of the seat over a gap formed between a lower region of the second covering member 22 and lower regions of the respective first covering members 21. As shown in FIG. 6, the outer covering 20 further includes two side covering members 26 provided to cover laterally outer side surfaces of the seat back pad 10. Each of the covering members 21, 22, 23, and 26 are mainly made of synthetic leather, fabric or the like.

It is to be understood that the first covering members 21 and the second covering member 22 may be provided from a single sheet of covering material or provided separately and connected to each other as in the illustrated embodiment.

Each of the first covering members 21 includes a front-side member 211 and a back-side member 212 made of synthetic leather, fabric or the like, and a cushion sheet 27 made of cushiony material such as urethane foam is held between the front-side member 211 and the back-side member 212. The peripheral edges of the front-side member 211 and the back-side member 212 are sewn together to shut up the crevice therebetween. The front-side member 211 is disposed frontward of the side support portion 12 of the seat back pad 10, and covers the side support portion 12 from the front side. In other words, the front-side member 211 covers the front side of the side support portion 12 (that is a side facing in a direction opposite to that in which the back side thereof on which the back plate 30 is disposed faces).

The first covering member 21 includes an inner-side end portion 21A provided at a laterally-inner-side end thereof and an outer-side end portion 21B provided at a laterally-outer-side end thereof. A lower region of the inner-side end portion 21A (to be specific, a portion spanning a nearly lower half of the longitudinal dimension of the seat, adjacent to the third covering member 23; see FIG. 5) is sewn and connected to an end portion of the third covering member 23. The outer-side end portion 21B is sewn and connected to an end portion of the side covering member 26. As shown in FIG. 5, an upper region of the inner-side end portion 21A (to be specific, a portion spanning a nearly upper half of the longitudinal dimension of the seat, with no third covering member 23 is provided adjacent thereto; see FIG. 5) is sewn and connected directly to a corresponding upper region of the second covering member 22.

Referring back to FIG. 6, an inside sheet 28 is disposed between the outer covering 20 (the first covering member 21 and the side covering member 26) and the seat back pad 10. The inside sheet 28 includes an inner-side end portion provided at a laterally-inner-side end thereof and an outer-side end portion provided at a laterally-outer-side end portion thereof. The inner-side end portion of the inside sheet 28 is sewn and connected to the first covering member 21, and the outer-side end portion of the inside sheet 28 is sewn and connected to the side covering member 26. To be more specific, the end portions of the front-side member 211 and the back-side member 212 of the first covering member 21 adjacent to the inside-sheet 28 are both folded back together and sewn to the inside-sheet 28; similarly the end portion of the side covering member 26 adjacent to the inside sheet 28 is folded back and sewn to the inside-sheet 28. With this configuration, the connection between the first covering member 21 and the side covering member 26 is enhanced.

The side covering member 26 extends from the first covering member 21 rearward, and wraps around the sidewall portion 32 of the back plate 30, and an end portion located at a back-side surface of the sidewall portion 32 is fixed to the sidewall portion 32.

The second covering member 22 is disposed frontward of the base pad portion 11 of the seat back pad 10, and configured to cover the base pad portion 11 from the front side; in other words, the second covering member 22 covers the front side of the base pad portion 11 (that is a side facing in a direction opposite to that in which the back side thereof on which the base portion 31 of the back plate 30 is disposed faces). As shown in FIG. 6, the second covering member 22 is provided in a position across the receptacle hole 13 from the first covering member 21; i.e., the receptacle hole 13 is located between the first covering member 21 and the second covering member 22. The second covering member 22 includes end portions 22A provided at laterally-outer-side ends thereof. Each of the end portions 22A of the second covering member 22 is sewn and connected to an end portion of the third covering member 23.

The third covering member 23 is a covering member provided to connect the first covering member 21 and the second covering member 22. The third covering member 23 is disposed frontward of the receptacle hole 13, and covers the receptacle hole 13 of the seat back pad 10 from the front side. The third covering member 23 has a lateral dimension longer than the shortest distance between the inner-side end portion 21A of the first covering member 21 located in the first position (i.e., the inner-side end portion 21A is located inside the receptacle hole 13) and the end portion 22A of the corresponding second covering member 22. The third covering member 23 has a backwardly protrusive shape such that its laterally central portion having a tiered or folded structure extending rearward (backward) is located inside the receptacle hole 13. In this embodiment, the third covering member 23 comprises a fourth covering member 24 connected to the first covering member 21 and a fifth covering member 25 connected to the second covering member 22.

The fourth covering member 24 includes a first-covering-side end portion 24A provided at a first-covering-member-side end thereof and a fifth-covering-side end portion 24B provided at a fifth-covering-member-side end thereof. The fifth covering member 25 includes a fourth-covering-side end portion 25A provided at a fourth-covering-member-side end thereof and a second-covering-side end portion 25B provided at a second-covering-member-side end thereof.

The first-covering-side end portion 24A of the fourth covering member 24 is sewn and connected to the inner-side end portion 21A of the first covering member 21. In other words, the first-covering-side end portion 24A of the fourth covering member 24 (i.e., the end portion of the third covering member 23) and the inner-side end portion 21A of the first covering member 21 are combined to form a first connecting portion C1 that is a portion at which the first covering member 21 and the third covering member 23 are connected.

The fifth-covering-side end portion 24B of the fourth covering member 24 is sewn and connected to the fourth-covering-side end portion 25A of the fifth covering member 25. In other words, the fifth-covering-side end portion 24B of the fourth covering member 24 and the fourth-covering-side end portion 25A of the fifth covering member 25 are combined to form a third connecting portion C3 that is a portion at which the fourth covering member 24 and the fifth covering member 25 are connected. The third connecting portion C3 is an example of an in-between portion disposed between the first connecting portion C1 and a second connecting portion C2 that will be described later.

The fourth covering member 24 is bent to bulge frontward and disposed between the first covering member 21 and the fifth covering member 25. When the first covering member 21 is in the first position as shown in FIG. 6, the fifth-covering-side end portion 24B (i.e., end portion provided at a laterally-inner-side end) of the fourth covering member 24 is located rearward of (closer to the back side of the seat than) the first-covering-side end portion 24A (i.e., end portion provided at a laterally-outer-side end) of the fourth covering member 24, so that the fifth-covering-side end portion 24B of the fourth covering member 24 is located inside the receptacle hole 13. In other words, when the first covering member 21 is located in the first position, the third connecting portion C3 is located in the receptacle hole 13. The third connecting portion C3 is configured to be moved by the frontward-backward motion of the first covering member 21 associated with the inflation and deflation of the bladder 65, to a third position in which the third connecting portion C3 is located inside the receptacle hole 13 as shown in FIG. 6, and to a fourth position (see FIG. 7) that is farther away from the back plate 30 than the third position.

The second-covering-side end portion 25B of the fifth covering member 25 is sewn and connected to the corresponding end portion 22A of the second covering member 22. The second-covering-side end portion 25B of the fifth covering member 25 (i.e., the end portion of the third covering member 23) and the corresponding end portion 22A of the second covering member 22 are combined to form a second connecting portion C2 that is a portion at which the second covering member 22 and the third covering member 23 are connected. The fifth covering member 25 is bent to bulge frontward and disposed between the second covering member 22 and the fourth covering member 24.

The end portions 25A, 25B of the fifth covering member 25 are both located inside the receptacle hole 13. When the first covering member 21 is in the first position, the end portion 25A provided at the laterally-outer-side end of the fifth covering member 25 is located rearward of (closer to the back side of the seat than) the end portion 25B provided at the laterally-inner-side end of the fifth covering member 25.

In the receptacle hole 13, an extension coil spring 70 as an example of an elastic member, and a tuck-in member 80 are provided. The extension coil spring 70 and the tuck-in member 80 are disposed substantially at the same height. In contrast, the second tube 64 mentioned above is disposed at a height different from the height at which the extension coil spring 70 and the tuck-in member 80 are disposed. To be more specific, the second tube 64 is disposed above the extension coil spring 70 and the tuck-in member 80.

The extension coil spring 70 is a member configured to bias the first connecting portion C1 rearward (toward the back plate 30 side). The extension coil spring 70 includes a first end portion connected through an intervening member 90 to the first connecting portion C1 and a second end portion engaged with a first engagement portion 31B provided in the back plate 30.

The intervening member 90 includes a first end portion sewn and connected to the first connection portion C1 and a second end portion having an engageable hole 91 configured to be engageable with the first end portion of the extension coil spring 70. The intervening member 90 may be made, for example, of the same material as that of the outer covering 20, or made preferably of a material harder than that of the outer covering 20. If the intervening member 90 is made of a material harder than that of the outer covering 20, the first end portion of the extension coil spring 70 can be engaged firmly with the engageable hole 91.

The base portion 31 of the back plate 30 includes a first engageable portion 31B and a second engageable portion 31D. With the first engageable portion 31B, the extension coil spring 70 mentioned above is engaged. With the second engageable portion 31D, a hook 83 that will be described later is engaged.

The tuck-in member 80 is a member configured to keep the second connecting portion C2 tucked in the receptacle hole 13. The tuck-in member 80 mainly includes a first joining member 81, a second joining member 82, and a hook 83. The first joining member 81, the second joining member 82 and the hook 83 are each made of a material having a stretchiness lower (i.e., less extensible under the same tensile load) than a stretchiness of the extension coil spring 70 so that inflation of the bladder 65 causes no deformation or dislocation of the second covering member 22.

The first joining member 81 extends from the second connecting portion C2 rearward (backward). The first joining member 81 has a front end portion sewn and connected to the second connecting portion C2 and a rear end portion sewn and connected to the second joining member 82. The second joining member 82 extends from the rear end portion of the first joining member 81 rearward (backward). The second joining member 82 has a front end portion sewn and connected to the rear end portion of the of the first joining member 81 and a rear end portion having an engageable hole 82A with which the hook 83 is engageable.

The hook 83 has a shape of a letter C that holds the rear end portion of the second joining member 82 and the second engageable portion 31D to engage with the engageable hole 82A of the second joining member 82 and the second engageable portion 31D.

The next discussion focuses on the action of the extension coil spring 70 and the operation of associated structures.

When the bladder 65 deflated as shown in FIG. 6 is supplied with air and inflated as shown in FIG. 7, the first covering member 21 is moved from the first position shown in FIG. 6 to the second position shown in FIG. 7. This causes the third covering member 23 to be pulled frontward by the first covering member 21, to a position frontward of the position shown in FIG. 6. Then, the extension coil spring 70 connected to the third covering member 23 moving frontward is stretched between the third covering member 23 and the back plate 30.

Thereafter, when the bladder 65 in an inflated state is deflated, the first covering member 21 is returned from the second position to the first position. In the course of this process, the third connecting portion C3 that is the in-between portion of the third covering member 23 is being biased backward (toward the back plate 30 side) by the extension coil spring 70; therefore, the third connecting portion C3 can be restored properly to the inside of the receptacle hole 13. Accordingly, in contrast to cases in which deflation of the bladder 65 fails to restore the third connecting portion C3 to the inside of the receptacle hole 13, the potential disadvantage of bringing the back of an occupant into contact with the third connecting portion C3, and causing the occupant discomfort can be eliminated or considerably reduced.

On the other hand, the second covering member 22 fixed to the back plate 30 by the tuck-in member 80 that is less stretchable than the extension coil spring 70 is not affected by the frontward or backward movement of the third covering member 23 caused by the expansion or contraction of the bladder 65, and rather retained without changing its position. Accordingly, the second covering member 22 can be prevented from getting wrinkled, so that the occupant can avoid experiencing discomfort due to the wrinkle that would otherwise be formed in the second covering member 22.

In the vehicle seat configured according to the present embodiment as described above, the following advantages, in addition to the advantages described above, can be achieved.

Since the third connecting portion C3 is located inside the receptacle hole 13 when it is in the third position, the third covering member 23 can be slacked without being protruded toward the occupant's side, and thus the slacking part (the third connecting portion C3) of the third covering member 23 can be prevented from getting in touch with the occupant and thereby causing the occupant discomfort.

Since the extension coil spring 70, the tuck-in member 80, and the second tube 64 are received in the same receptacle hole 13, the extension coil spring 70, the tuck-in member 80, and the second tube 64 can be arranged more effectively in comparison, for example, with alternative configurations in which other hole(s) are provided in the seat back pad 10.

Since the hand-operated pump 61 is disposed on a side opposite to a side on which the protruding portion 42 of the support frame 40 is disposed with respect to the center of the seat back pad 10 in the lateral direction, the hand-operated pump 61 is not likely to obstruct the occupant's manipulation of the hand-operated pump 61, so that the operational ease of the hand-operated pump 61 can be improved.

Although one illustrative embodiment has been described above, the present invention is not limited to the above-described embodiment. Specific configurations may be changed or modified, where appropriate, without departing from the scope of the present invention as defined in the appended claims. In the following description, the same elements as those described above in respect of the above-described embodiment are designated by the same reference numerals, and a duplicate description thereof will be omitted.

Figure 8:
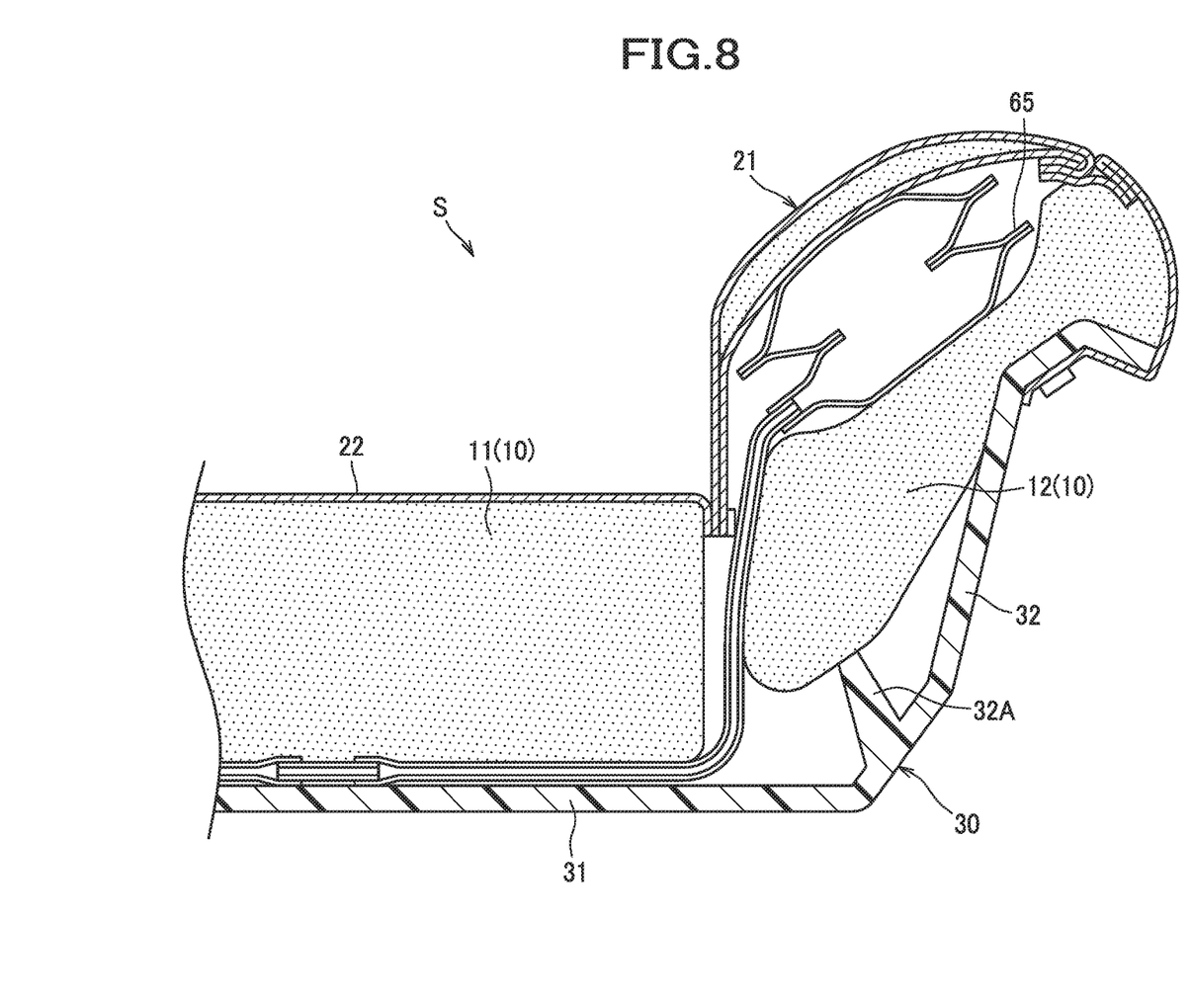
FIG. 8 is a sectional view showing a modified embodiment.

The shape of the back plate 30 and associated structures are not limited to those illustrated in the drawings of the above-described embodiment. For example, as shown in FIG. 8, a projection 32A protruding obliquely in the frontward-and-laterally-inward direction may be provided on the sidewall portion 32. The side support portion 12 of the seat back pad 10 may be supported at a distal end of the projection 32, and space is provided between the back side of the side support portion 12 and the base portion 31 and between the laterally outer side of the side support portion 12 and the sidewall portion 32. In other words, the front portion of the side support portion 12 may be provided to come in contact with the sidewall portion 32 and the rear portion of the side support portion 12 may be provided separately from the sidewall portion 32. With this configuration, inflation of the bladder 65 causes the rear portion of the side support portion 12 into the space, and thus causes the side support portion 12 to turn on the contacting portion between the front portion of the side support portion 12 and the sidewall portion 32, so that the side support portion 12 can be deformed to conform to the occupant's body.

Although the above-described embodiment is configured such that the receptacle hole 13 is a through hole that pierces (extends through) the front side and the back side of the seat back pad 10 in the frontward-backward direction, the present invention is not limited to this specific configuration. For example, the receptacle hole may be a blind hole or groove that only opens to the front side (i.e., facing the outer covering) and has a closed bottom at the back side. In this alternative configuration, a support member such as a wire, etc. may be provided in the bottomed receptacle hole, and the elastic member and/or the tuck-in member may be attached to such a support member.

Although the extension coil spring 70 is adopted as an elastic member in the above-described embodiment, the present invention is not limited to this specific configuration. The elastic member may be, for example, a torsion spring or rubber, or the like.

In the above-described embodiment, the extension coil spring 70 is connected to the third connecting member C3, but the present invention is not limited to this specific configuration. The elastic member consistent with the present invention may, for example, be connected to the first connecting portion, instead. Also, the elastic member may be connected directly to the first connecting portion or the third connecting portion.

In the above-described embodiment, the tuck-in member 80 is configured to have a stretchiness lower than a stretchiness of the extension coil spring 70, but the present invention is not limited to this specific configuration. The tuck-in member may be configured to have a stretchiness equal to or higher than a stretchiness of the elastic member. For example, the tuck-in member 80 configured to less stretchy according to the present embodiment may be replaced with an extension coil spring, and the second covering member may be tucked in and kept inside the receptacle hole, using this extension coil spring.

In the above-described embodiment, the third connecting member C3 is provided as the in-between portion, but the present invention is not limited to this specific configuration. For example, where the third covering member is of a single sheet configuration, the in-between portion may be a portion (of the third covering member) between the first connecting portion and the second connecting portion.

In the above-described embodiment, the outer covering 20 is configured to comprise a plurality of outer covering members 21, 22, 23 (24, 25), and 26, but the present invention is not limited to this specific configuration. For example, the outer covering 20 may be configured to be of a single sheet configuration. In this alternative, the single-sheet covering member may be defined into a first portion and a second portion, and an elastic member and a tuck-in member may be provided in an adequate manner.

In the above-described embodiment, the seat back pad 10 is adopted as an example of the cushion pad, but the present invention is not limited to this configuration. The cushion pad consistent with the present invention may be a seat cushion pad which constitutes a seat cushion. In this alternative, the base frame may be a seat cushion frame provided to support the back side of the seat cushion (from underside thereof).

In the above-described embodiment, the side support actuator 60 with the bladder 65 is adopted as an example of an actuator consistent with the present invention, but the present invention is not limited to this configuration. The actuator may, for example, be a device configured to actuate both side portions of a pressure-receiving plate (member for supporting the seat back pad from back side) frontward and backward by using a driving force of a motor. Alternatively or additionally, the actuator may, for example, be a device configured to actuate a laterally central portion of the seat back frontward and backward.

In the above-described embodiment, the hand-operated pump 61 is adopted as an example of a pump consistent with the present invention, but the present invention is not limited to this configuration. The pump may be a motorized pump, for example.

In the above-described embodiment, the protruding portion 42 is illustrated as being made of pipe adapted for preventing an occupant from falling off the seat, but the present invention is not limited to this configuration. The protruding portion may, for example, be an armrest. In this alternative, the armrest may be located at the left or right side of the seat closer to the center of the vehicle in the lateral direction (laterally inner side with respect to the vehicle).

In the above-described embodiment, the car seat S as installed in an automobile is illustrated as an example of a vehicle seat, but the present invention is not limited to the illustrated embodiments, and is also applicable to any other vehicle seat for use, for example, in ships and aircraft, etc.

Various aspects and embodiments are further specified in the following paragraphs:

(1) A vehicle seat comprising: a cushion pad having a front side and a back side, and a receptacle hole provided at the front side; a base frame provided at the back side to support the cushion pad; an outer covering configured to cover the front side of the cushion pad and fixed to the base frame, the outer covering including a first portion; an actuator configured to move the first portion to a first position in which a part of the first portion is located inside the receptacle hole, and to a second position farther away from the base frame than the first position; and an elastic member provided in the receptacle hole, connected to the part of the first portion, and configured to bias the first portion toward the base frame.

With this configuration specified in paragraph (1), even when the actuator causes the first portion of the outer covering to move to the second position and a part of the first portion is pulled out of the receptacle hole, the first portion subsequently actuated to move back to the first position is biased toward the base frame by the elastic member connected to the part of the first portion, so that the part of the first portion that should be located inside the receptacle hole when the first portion is in the first position can be restored properly to the inside of the receptacle hole.

(2) The vehicle seat according to paragraph (1), further comprising a tuck-in member disposed in the receptacle hole, wherein the outer covering further includes a second portion, the receptacle hole being located between the first portion and the second portion, and the tuck-in member being configured to keep the second portion tucked in the receptacle hole. Herein the second portion may be provided integrally with the first portion, so that the first and second portions are formed from a single sheet of the outer covering material.

With this additional configuration specified in paragraph (2), undesirable dislocation of the second portion from a predetermined position as would otherwise be caused by the movement of the first portion can be suppressed.

(3) The vehicle seat according to paragraph (2), wherein the tuck-in member has a stretchiness lower than a stretchiness of the elastic member.

With this additional feature specified in paragraph (3), the lower stretchiness of the tuck-in member serves to effectively suppress the dislocation of the second portion from the predetermined position when the first portion is caused to move.

(4) The vehicle seat according to paragraph (3), wherein the outer covering further includes a third covering member disposed between the first portion and the second portion and configured to connect the first portion and the second portion, the first portion and the third covering member being connected at a first connecting portion, and the second portion and the third covering member being connected at a second connecting portion, wherein the elastic member is configured to bias the first connecting portion toward the base frame, and wherein the tuck-in member is configured to keep the second connecting portion tucked in the receptacle hole. Herein, the third covering member may be provided integrally with both or either of the first portion and the second portion; namely, the first and second portions and the third covering member may be formed from a single sheet of the outer covering material.

With this additional configuration specified in paragraph (4), the second connecting portion tucked into and retained inside the receptacle hole is prevented from getting in touch with an occupant and causing the occupant discomfort.

(5) The vehicle seat according to paragraph (4), wherein the third covering member includes an in-between portion disposed between the first connecting portion and the second connecting portion, the in-between portion being movable to a third position inside the receptacle hole and to a fourth position farther away from the base plate than the third position, and wherein the elastic member is connected to the in-between portion.

With this additional configuration specified in paragraph (5), the in-between portion of the third covering member is located inside the receptacle hole when it is in the third position, and thus the third covering member can be slacked without being protruded toward the occupant's side, so that the slacking part of the third covering member can be prevented from getting in touch with the occupant and causing the occupant discomfort.

(6) The vehicle seat according to paragraph (5), wherein the third covering member comprises a fourth covering member and a fifth covering member, the fourth covering member being connected to the first portion at the first connecting portion, the fifth covering member being connected to the second portion at the second connecting portion and connected to the fourth covering member at a third connecting portion, and wherein the in-between portion is the third connecting portion.

With this additional configuration specified in paragraph (6), the third connecting portion is located inside the receptacle hole when it is in the third position, and thus the third connecting portion can be prevented from getting in touch with the occupant and causing the occupant discomfort.

(7) The vehicle seat according to paragraph (1), wherein the receptacle hole is a through hole provided to pierce the front side and the back side of the cushion pad, and wherein the actuator includes: a bladder disposed between the outer covering and the cushion pad; a tube connected to the bladder; and a pump connected to the tube, and wherein the tube is disposed through the receptacle hole.

With this additional configuration specified in paragraph (7), the elastic member, the tuck-in member and the tube can be installed efficiently in the same receptacle hole.

(8) The vehicle seat according to paragraph (7), wherein the cushion pad is a seat back pad that constitutes a seat back of the vehicle seat, the seat back pad comprising a center portion and a side portion that are arranged in a lateral direction, wherein the receptacle hole is disposed between the center portion and the side portion, and wherein the first portion is disposed at a front side of the side portion.

With this additional configuration specified in paragraph (8), since the first portion provided at the front side of the side portion is actuated, the first portion can be moved so as to conform to the physique of an occupant.

(9) The vehicle seat according to paragraph (8), further comprising a support frame, the support frame comprising: a support portion provided at a back side of the base frame to support the base frame; and a protruding portion configured to extend from the support portion along a laterally outer side of the base frame on a first side that is one of two sides defined by a vertical plane intersecting a center in the lateral direction of the seat back pad, and to protrude beyond the seat back pad frontward, wherein the pump is a hand-operated pump disposed on a second side that is another of the two sides defined by the vertical plane.

With this additional configuration specified in paragraph (9), the protruding portion is not likely to obstruct the occupant's manipulation of the hand-operated pump, and thus the operational ease of the hand-operated pump can be improved.

(10) A vehicle seat comprising: a cushion pad including a receptacle hole; a base frame configured to support the cushion pad; an outer covering configured to cover the cushion pad and fixed to the base frame, the outer covering including a first portion and a second portion, wherein a part of the second portion of the outer covering is retained inside the receptacle hole; an actuator configured to move the first portion of the outer covering to a first position in which a part of the first portion of the outer covering is located inside the receptacle hole, and to a second position farther away from the base frame than the first position; and an elastic member provided in the receptacle hole, connected to the part of the first portion of the outer covering, and configured to bias the first portion of the outer covering toward the base frame.

(11) The vehicle seat according to paragraph (10), further comprising a tuck-in member disposed in the receptacle hole, the tuck-in member being configured to keep the second portion of the outer covering tucked in the receptacle hole such that the part of the second portion of the outer covering is connected to the base frame via the tuck-in member.

(12) The vehicle seat according to paragraph (10), wherein the outer covering further includes a third portion disposed over the receptacle hole, and wherein the elastic member is connected through the third portion of the outer covering to the part of the first portion of the outer covering.

(13) The vehicle seat according to paragraph (12), wherein the third portion of the outer covering includes a fourth portion and a fifth portion, the fourth portion having a first end and a second end, the first end being connected to the part of the first portion of the outer covering, the fifth portion having a third end and a fourth end, the fourth end being connected to the part of the second portion of the outer covering, and wherein the second end of the fourth portion and the third end of the fifth portion are connected to each other to form an in-between portion that is connected to the elastic member.

It will be appreciated by persons having ordinary skill in the art that many variations, additions, modification, and other applications may be made to what has been particularly shown and described herein by way of embodiments, without departing from the scope of the invention. Therefore, it is intended that the scope of the invention, as defined by the claims below, includes foreseeable combination of features, variations, additions, modifications, or applications.

What is claimed is:

1. A vehicle seat comprising:
   a cushion pad having a front side and a back side, and a receptacle hole provided at the front side;
   a base frame provided at the back side to support the cushion pad;
   an outer covering configured to cover the front side of the cushion pad and fixed to the base frame, the outer covering including a first portion, a second portion, and a third covering member, the third covering member being disposed between the first portion and the second portion and configured to connect the first portion and the second portion, the first portion and the third covering member being connected at a first connecting portion, and the second portion and the third covering member being connected at a second connecting portion, the receptacle hole being located between the first portion and the second portion;
   an actuator configured to move the first portion to a first position in which a part of the first portion is located inside the receptacle hole, and to a second position farther away from the base frame than the first position;
   an elastic member provided in the receptacle hole, connected to the part of the first portion, and configured to bias the first portion toward the base frame; and
   a tuck-in member disposed in the receptacle hole, the tuck-in member being configured to keep the second portion tucked in the receptacle hole, the tuck-in member being less extensible under a same tensile load than the elastic member,
   wherein the elastic member is configured to bias the first connecting portion toward the base frame, and
   the tuck-in member is configured to keep the second connecting portion tucked in the receptacle hole.

2. The vehicle seat according to claim 1, wherein the third covering member includes an in-between portion disposed between the first connecting portion and the second connecting portion, the in-between portion being movable to a third position inside the receptacle hole and to a fourth position farther away from the base plate than the third position, and
   wherein the elastic member is connected to the in-between portion.

3. The vehicle seat according to claim 2, wherein the third covering member comprises a fourth covering member and a fifth covering member, the fourth covering member being connected to the first portion at the first connecting portion, the fifth covering member being connected to the second portion at the second connecting portion and connected to the fourth covering member at a third connecting portion, and
   wherein the in-between portion is the third connecting portion.

4. A vehicle seat comprising:
a cushion pad having a front side and a back side, and a receptacle hole provided at the front side;
a base frame provided at the back side to support the cushion pad;
an outer covering configured to cover the front side of the cushion pad and fixed to the base frame, the outer covering including a first portion;
an actuator configured to move the first portion to a first position in which a part of the first portion is located inside the receptacle hole, and to a second position farther away from the base frame than the first position; and
an elastic member provided in the receptacle hole, connected to the part of the first portion, and configured to bias the first portion toward the base frame,
wherein the receptacle hole is a through hole provided to pierce the front side and the back side of the cushion pad,
wherein the actuator includes:
a bladder disposed between the outer covering and the cushion pad;
a tube connected to the bladder; and
a pump connected to the tube, and
wherein the tube is disposed through the receptacle hole.

5. The vehicle seat according to claim 4, wherein the cushion pad is a seat back pad that constitutes a seat back of the vehicle seat, the seat back pad comprising a center portion and a side portion that are arranged in a lateral direction,
wherein the receptacle hole is disposed between the center portion and the side portion, and
wherein the first portion is disposed at a front side of the side portion.

6. The vehicle seat according to claim 5, further comprising a support frame, the support frame comprising:
a support portion provided at a back side of the base frame to support the base frame; and
a protruding portion configured to extend from the support portion along a laterally outer side of the base frame on a first side that is one of two sides defined by a vertical plane intersecting a center in the lateral direction of the seat back pad, and to protrude beyond the seat back pad frontward,
wherein the pump is a hand-operated pump disposed on a second side that is another of the two sides defined by the vertical plane.

7. A vehicle seat comprising
a cushion pad including a receptacle hole;
a base frame configured to support the cushion pad;
an outer covering configured to cover the cushion pad and fixed to the base frame, the outer covering including a first portion, a second portion, and a third portion disposed over the receptacle hole, wherein a part of the second portion of the outer covering is retained inside the receptacle hole;
an actuator configured to move the first portion of the outer covering to a first position in which a part of the first portion of the outer covering is located inside the receptacle hole, and to a second position farther away from the base frame than the first position; and
an elastic member provided in the receptacle hole, connected to the part of the first portion of the outer covering, and configured to bias the first portion of the outer covering toward the base frame,
wherein the elastic member is connected through the third portion of the outer covering to the part of the first portion of the outer covering.

8. The vehicle seat according to claim 7, further comprising a tuck-in member disposed in the receptacle hole, the tuck-in member being configured to keep the second portion of the outer covering tucked in the receptacle hole such that the part of the second portion of the outer covering is connected to the base frame via the tuck-in member.

9. The vehicle seat according to claim 7, wherein the third portion of the outer covering includes a fourth portion and a fifth portion, the fourth portion having a first end and a second end, the first end being connected to the part of the first portion of the outer covering, the fifth portion having a third end and a fourth end, the fourth end being connected to the part of the second portion of the outer covering, and
wherein the second end of the fourth portion and the third end of the fifth portion are connected to each other to form an in-between portion that is connected to the elastic member.

* * * * *